June 9, 1942.  A. B. CARROLL  2,285,567
DEVICE FOR REMOVING CORN FROM THE COB
Filed Dec. 31, 1940
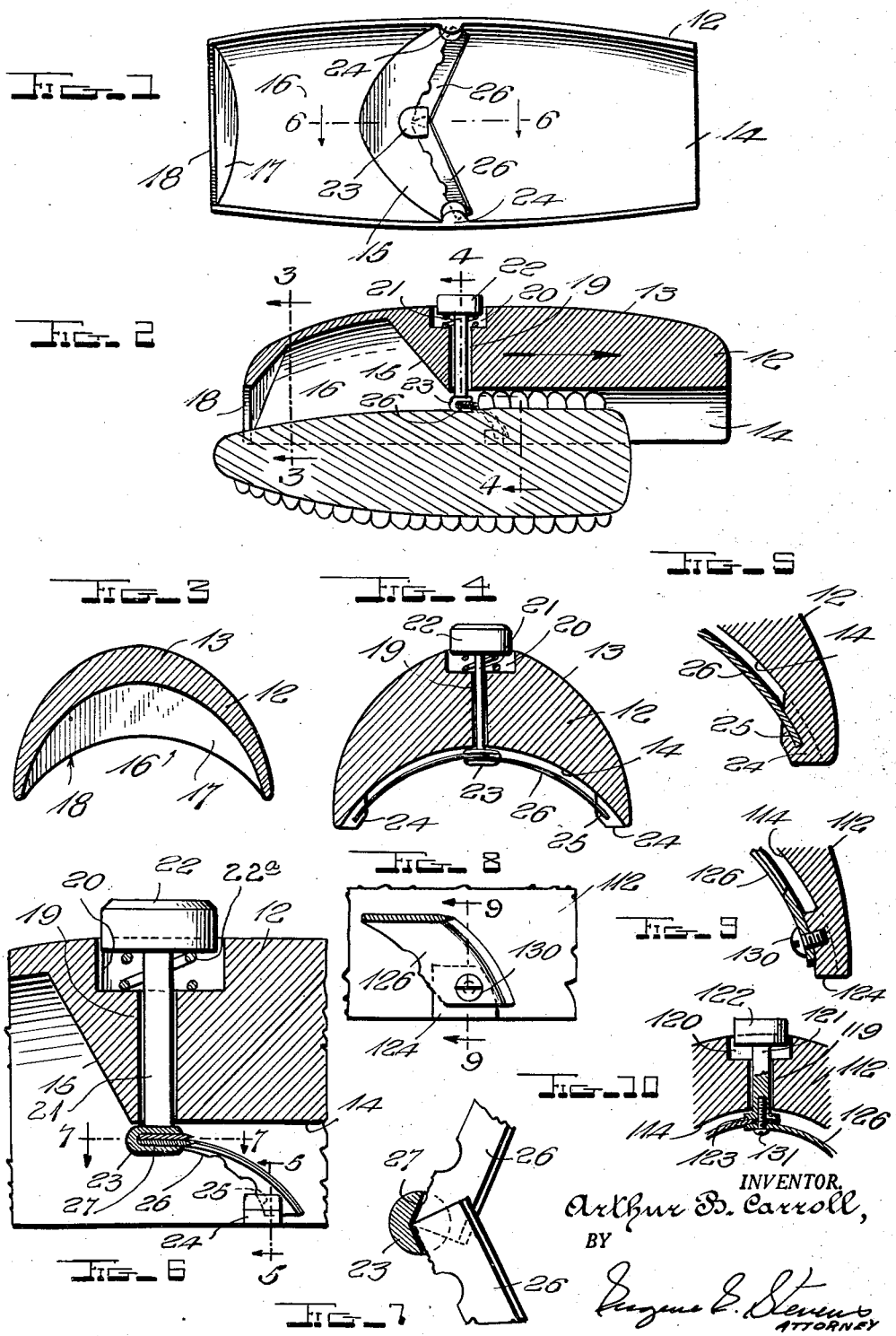
INVENTOR.
Arthur B. Carroll,
BY
Eugene E. Stevens
ATTORNEY Patented June 9, 1942

2,285,567

UNITED STATES PATENT OFFICE 2,285,567

DEVICE FOR REMOVING CORN FROM THE COB

Arthur B. Carroll, Norfolk, Va.

Application December 31, 1940, Serial No. 372,644

10 Claims. (Cl. 146—4)

My invention relates to devices for cutting green or cooked corn from the cob and/or for thereafter scraping the cob to remove those portions of the kernels which adhere to the cob after the cutting operation.

With the foregoing in view, an object of my invention is to provide a corn cutter wherein the blades are readily formed, applied to or removed from the cutter by the operator.

A further object is to provide in such a cutter, means for quickly adjusting the depth of cut of the cutting blades by the operation in accordance with the type of cut desired.

A further object is to provide means whereby the depth of cut can be varied during an actual cutting stroke.

A further object is to provide a novel combination of green or boiled corn cutter with a scraper for the cob.

A further object is to provide a novel cutter blade for such a device.

A further object is to provide novel mounting means for a cutter blade.

A further object is to provide a novel cob scraper.

Other objects and advantages reside in the particular structure of the device, combination and arrangement of the several parts and in the particular mode of operation, all of which will be readily apparent to those skilled in the art upon reference to the drawing in connection with the following detailed description wherein the invention is described and claimed.

In the drawing:

Fig. 1 is a bottom plan view of one form of the invention;

Fig. 2 is a longitudinal vertical section thereof showing the device in use;

Fig. 3 is a transverse, vertical section on the plane of the line 3—3 of Fig. 2;

Fig. 4 is a like view taken on the plane of the line 4—4 of Fig. 2;

Fig. 5 is an enlarged vertical section of a detail;

Fig. 6 is an enlarged vertical section showing a portion of Fig. 2;

Fig. 7 is a horizontal section on the plane of the line 7—7 of Fig. 6;

Fig. 8 is a fragmentary elevation, partly in vertical section of a detail of a modification;

Fig. 9 is a fragmentary vertical section of a detail of the modification; and

Fig. 10 is a fragmentary, transverse vertical section of a further detail of the modification.

In the drawing, wherein like reference characters have been used throughout to designate like parts and referring particularly to the form of invention illustrated in Figs. 1–7, inclusive, 12 designates the body of my cutter which is generally semi-cylindrical in shape with a rounded back 13 adapted to be gripped by the hand of the user. The forward end of the face of the body 12 is formed with a semi-cylindrical groove 14 which is intended to conform generally to the shape of an ear of corn. The rear end of the face of the body 12 is hollowed out as at 16 and is connected to the rear end of the groove 14 by an inclined abutment wall 15. The rear end of the hollow portion 16 is partially closed by an end wall 17, the outer or free edge of which is formed to provide a concave scraping edge 18 which conforms generally with the curvature of the groove 14 and which may be, and preferably is, in register with said groove 14.

A radial bore 19 extends through the body 12 from the end of the groove 14 which is adjacent the abutment wall 15 and opens into an enlarged recess 20 formed in the back 13 of the body 12. A stem 21 is freely slidable in the bore 19 and is provided with an enlarged head 22 which is receivable in the recess 20. The inner end of the stem 21 is also provided with an enlarged head 23 which will be described in detail presently. Either the head 22, the head 23 or both may be detachably secured to the stem 21 in any suitable manner (not shown).

A pair of like bosses 24 are formed on the free edges of the groove 14 adjacent the rear end thereof but forwardly of the bore 19. The bosses 24 are oppositely disposed with respect to each other and each is provided with a like slot 25 which is formed in the front and inner faces of each boss 24. The slots 25 each receive the outer end of a flexible cutting blade 26. The blades 26, it should be noted, may be readily formed by snapping an ordinary flexible, double-edged razor blade in half longitudinally. Obviously, an especially manufactured blade or blades may be used if desired. The inner ends of the blades 26 are lapped and inserted into a forwardly facing and substantially V-shaped slot 27 (Fig. 7) which is formed in the inner head 23 of the stem 21. The blades 26 are arranged in V-shape (Fig. 1) but are flexed to conform substantially to the curvature of the groove 14 (Fig. 4).

The slots 25 in the bosses 24 and the slot 27 in the head 23 are sized for a frictional fit with the blades 26 and flexing of the blades tensions them and tends to tighten the frictional fit in the slots whereby the blades are retained in position at all times. The device is operated for cutting in the direction of the arrow of Fig. 2 which movement forces the blades 26 against the closed back walls of the slots 25 and 27. The inner, rear corners of the blades 26 (Fig. 7) bear against the apex of the slot 27 whereby endwise movement of the blades in an inward direction is prevented. Outward endwise movement in an inward direction of the blades 26 is prevented by the fact that the slots 25 do not extend all of the way through the bosses 24 (Figs. 4 and 5).

At the same time, should the blades become dull, they may be readily removed by being slid out of the slots 25 and 27 in the direction of the arrow of Fig. 2. Obviously, a single V-shaped blade could be used if desired.

The device is used as is shown in Fig. 2, by being fitted over an ear of corn and moved longitudinally thereof in the direction of the arrow. When all of the grains are cut from the cob, the cob can be scraped by merely depressing the rear end of the device slightly to bring the scraper edge 18 into contact with the cob. This can be done without changing the user's grip on the tool if the tool is positioned in the hand with the front end (the right end in Figs. 1 and 2) in the palm and the device is drawn toward the user. When gripped in this manner, the depth of cut can be controlled by placing the forefinger on the head 22 of the stem 21 and depressing the same slightly. Thus, the smaller grains at one end of the ear can be operated upon with the blades in their normal position and the larger grains at the other end of the ear can be severed by progressively increasing the pressure on the head 22 as the device is drawn along the ear. The inherent resiliency of the blades 26 and spring 22a in recess 20 normally maintain the stem 21 and head 22 projected as shown. The hollow portion 16 behind the blades 26 provides a chamber in which the cut grains are received after they are cut.

The modification of Figs. 8, 9 and 10 is substantially the same as the first described form of the invention except for the manner in which the blades are attached. In the modification, the body 112 has a groove 114 corresponding to the groove 14, bosses 124 corresponding to the bosses 24 and a radially bore 119 and recess 120 corresponding to the bore 19 and recess 20. A stem 121 is movable through the bore 119 and is provided with outer and inner heads 122 and 123, respectively. The head 123 is tapped to receive a screw 131 and the opposed faces of the bosses 124 are similarly tapped to receive screws 130. The blades 126 are formed with holes at their ends through which the screws 130 and 131 are extended to mount the blades in place. While I have shown the blades 126 as being formed from razor blades, it may be desirable to utilize special blades with this form on account of the difficulty in forming holes through the usual razor blade for the screws 130 and 131. The operation of this form of the invention is the same as that of the first described form and all elements not shown in Figs. 8–10 are the same as those of Figs. 1–7.

While I have shown and described what are now thought to be the preferred forms of my invention, it is to be understood that the same is susceptible of other forms and expressions. Consequently, it is not my intention to limit myself to the precise structures shown and described, except as hereinafter claimed.

I claim:

1. A device for cutting corn from a cob, comprising a body, a substantially semi-cylindrical groove formed in one face of the body at one end thereof, at least one cutting blade arranged across said groove, said blade being curved to be substantially concentric to the curvature of said groove and being spaced from the floor thereof, a scraping blade for a cob formed across said face at the other end of said body, said scraping blade having a curved scraping edge conforming substantially in curvature to the curvature of said groove and being in substantial registry with said groove, opposed bosses formed in said groove, opposed tapped holes in said bosses, end portions of said blade being provided with holes, and screws adapted to be passed through said holes in said blade and to be received in said holes in said bosses to connect said blade to said body.

2. A device for cutting corn from a cob, comprising a body, a substantially semi-cylindrical groove formed in one face of said body, a V-shaped cutting blade arranged transversely across said groove in spaced and substantially concentric relation to the floor thereof, means detachably connecting said blade to said body, means for adjusting the depth of cut of said blade, said means being engaged with the apex of said blade to support the same, and means for operating said adjusting means from the opposite face of said body from said groove during a cutting operation.

3. A device for cutting corn from a cob, comprising a body, a substantially semi-cylindrical groove formed in one face of said body, a curved cutting blade arranged transversely of said groove in spaced relation to the floor thereof, means connecting the ends of said blade to said body, means for adjusting the depth of cut of said blade, said adjusting means being engageable with an intermediate portion of said blade, and means for operating said adjusting means from the opposite face of said body from said groove during a cutting operation.

4. A device for cutting corn from a cob, comprising a body, a substantially semi-cylindrical groove formed in one face of said body, a pair of cutting blades arranged end to end across said groove in a V-shaped arrangement and in spaced relation to the floor of said groove, separate means connecting the outer end of each blade to said body, and a single means connecting the inner ends of both blades to said body.

5. The structure of claim 4, said last named means being movable to vary the depth of cut of both blades simultaneously, and means for operating said movable means from the opposite face of said body from said groove during a cutting stroke.

6. A device for cutting corn from a cob, comprising a body, a substantially semi-cylindrical groove formed in one face of said body, a pair of tensioned cutting blades arranged end to end across said groove in a V-shaped arrangement and in spaced and substantially concentric relation to the floor of said groove, a pair of opposed bosses formed on opposite edge portions thereof, a slot in each boss, an outer end of each blade being frictionally received in each slot, a member projecting above the floor of said groove centrally thereof, a slot in one face of said member, the inner ends of said blades being frictionally received in said last named slot.

7. A device for cutting corn from a cob, comprising a body, a substantially semi-cylindrical groove formed in one face of said body, a pair of tensioned cutting blades arranged end to end across said groove in a V-shaped arrangement and in spaced and substantially concentric relation to the floor of said groove, a pair of opposed bosses formed on opposite edge portions thereof, threaded means connecting the outer end of each blade to one of said bosses, a member projecting above the floor of said groove centrally thereof, and a single threaded means connecting the inner ends of both blades to said member.

8. The structure of claim 6, said slot in said member being V-shaped to prevent endwise movement of the inner ends of said blades in a direction to relieve the tension thereof.

9. The structure of claim 6, all of said slots opening in a forward direction, and said blades being adapted to be removable from said body by being slid forwardly out of said slots.

10. A device for cutting corn from a cob, comprising a body, a substantially semi-cylindrical groove formed in one face of the body at one end thereof, at least one cutting blade arranged across said groove, said blade being curved to be substantially concentric to the curvature of said groove and being spaced from the floor thereof, a scraping blade for a cob formed across said face at the other end of said body, said scraping blade having a curved scraping edge conforming substantially in curvature to the curvature of said groove and being in substantial registry with said groove, opposed bosses formed in said groove, opposed tapped holes in said bosses, end portions of said blade being provided with holes, and screws adapted to be passed through said holes in said blade and to be received in said holes in said bosses to connect said blade to said body.

ARTHUR B. CARROLL.